US007647021B2

(12) United States Patent
Moore et al.

(10) Patent No.: US 7,647,021 B2
(45) Date of Patent: *Jan. 12, 2010

(54) MULTITIER ASP SERVICES DELIVERY FOR WIRELESS DEVICES

(75) Inventors: Victor S. Moore, Boynton Beach, FL (US); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 527 days.

This patent is subject to a terminal disclaimer.

(21) Appl. No.: 09/923,506

(22) Filed: Aug. 6, 2001

(65) Prior Publication Data
US 2003/0027525 A1 Feb. 6, 2003

(51) Int. Cl.
*H04B 5/00* (2006.01)
(52) U.S. Cl. .................... 455/41.1; 455/41.2; 455/41.3; 455/562.1; 709/238
(58) Field of Classification Search ....... 455/41.1–41.3, 455/412.1–412.2, 414.1, 417, 461, 466, 562.1, 455/556.1, 456.2, 411; 370/352; 709/203, 709/238; 705/27
See application file for complete search history.

(56) References Cited

U.S. PATENT DOCUMENTS

| 6,128,503 | A * | 10/2000 | Granberg et al. ............ 455/461 |
| 6,438,369 | B1 * | 8/2002 | Huang et al. ................ 455/417 |
| 6,453,029 | B1 * | 9/2002 | Campbell ................ 379/114.2 |
| 6,571,095 | B1 * | 5/2003 | Koodli ..................... 455/435.1 |
| 6,571,221 | B1 * | 5/2003 | Stewart et al. ................. 705/52 |
| 6,574,467 | B1 * | 6/2003 | Jonsson .................... 455/414.1 |
| 6,732,176 | B1 * | 5/2004 | Stewart et al. .............. 709/227 |
| 6,751,455 | B1 * | 6/2004 | Acampora ............... 455/414.1 |
| 6,816,724 | B1 * | 11/2004 | Asikainen ................ 455/414.1 |
| 6,954,735 | B1 * | 10/2005 | Djupsjobacka et al. ........ 705/27 |
| 7,020,456 | B2 * | 3/2006 | Smeets et al. ................ 455/411 |
| 2002/0022453 | A1 * | 2/2002 | Balog et al. ................... 455/41 |
| 2002/0086689 | A1 * | 7/2002 | Moran et al. ................ 455/466 |
| 2002/0101858 | A1 * | 8/2002 | Stuart et al. ................ 370/352 |
| 2002/0133616 | A1 * | 9/2002 | Yoza et al. .................. 709/238 |
| 2002/0187750 | A1 * | 12/2002 | Majumdar ................... 455/41 |
| 2003/0013434 | A1 * | 1/2003 | Rosenberg et al. .......... 455/414 |
| 2003/0096633 | A1 * | 5/2003 | Goldberg .................... 455/556 |

OTHER PUBLICATIONS

Krasnoff, B., *Bluetooth: Piconets & PANs*, www.cConvergence.com, pp. 77-86, (Jun. 2001).

* cited by examiner

*Primary Examiner*—Md S Elahee
(74) *Attorney, Agent, or Firm*—Novak Druce + Quigg LLP (57) ABSTRACT

A multi-tier ASP delivery system. The system can include a host computing device configured to communicate both with a computer communications network and with a plurality of wireless devices in a personal area network (PAN). In particular, a short-range radio communications system can be provided with which wireless communications in the PAN can be established and maintained. A list of ASP services further can be provided which indicates those ASP services which can be accessed by the wireless devices in the PAN. The ASP services in the list can reside locally in the host computing device and remotely in ASP servers in the computer communications network.

16 Claims, 5 Drawing Sheets

MULTITIER ASP SERVICES DELIVERY FOR WIRELESS DEVICES

BACKGROUND OF THE INVENTION

1. Technical Field

This invention relates to the field of personal area networking and more particularly to a system and method for providing ASP services to wireless devices.

2. Description of the Related Art

In recent times, the Internet has experienced phenomenal growth with more and more people accessing data and applications on the Internet through personal computers, and more recently, network computers. Historically, computing applications have been distributed as shrink-wrapped client applications. More recently, however, businesses have invested in Internet-distributed, Web-based applications, for instance Web-based customer relationship management (CRM) applications. An application service provider (ASP) is an entity that offers individuals and companies access to applications and related services over the Internet that would otherwise have to be located in their own personal or enterprise computers. Sometimes referred to as "apps-on-tap," ASP services are an important alternative to traditionally distributed software, not only for smaller companies with low budgets for information technology, but also for larger companies as a form of outsourcing.

While ASP providers can provide applications and services to enterprises and individuals on a pay-per-use or subscription basis, larger entities can provide their own internal ASP service resulting in the movement of applications off personal computers and onto an application server designed to communicate with thin-client workstations. By employing an ASP architecture, enterprises can reassert central control over application cost and usage similar to the central control experience by enterprises prior to the advent of the personal computer during the era of the mainframe computer.

To date, the ASP architecture has not been employed as widely in the wireless arena as it has in the wire-line arena. Specifically, whereas client access to distributable applications is growing among traditional wire-line networked clients, client access has been limited for wireless devices, such as handheld computers. Recently, pervasive computing has suggested the distribution of data to wireless devices using conventional infrared communications technology. In terms of wire-bound, cable replacement, the infrared standard promulgated by the Infrared Data Association (IRDA) is well known and widespread. Though the IRDA promulgated standard is a fast wireless technology, the IRDA promulgated standard is limited to point-to-point connections and above all, infrared communications require a clear line-of-sight between an infrared receiver and an infrared transmitter. Additionally, infrared communication technologies have experienced problems with incompatible standard implementations.

Recently, wireless phone service providers also have begun to provide wireless access to Internet distributed data through cellular communications links. Still, long-range radio communication technologies like cellular communications links can be expensive and power-consuming. Moreover, cellular transmitters and receivers require device housing space which can dramatically add to the overall size of a wireless device. Finally, long-range radio communications links can be limited in bandwidth. Hence, cellular technologies are not suitable for the distribution of applications from an ASP to pervasive computing devices such as handheld computers.

A new type of wireless connection has been introduced into the wireless market. Emerging standards for personal area networks (PANs), for instance the IEEE 802.11a, IEEE 802.11b and the BLUETOOTH (™) standard, enjoy a communications profile which is substantially different than the communications profile associated with cellular networks and infrared technologies. In particular, unlike cellular networks, PANs operate over a very limited local range. As an example, both BLUETOOTH and IEEE 802.11b operate in "piconets" having a normal range of ten (10) meters and a maximum range of approximately one-hundred (100) meters. IEEE 802.11a has a substantially greater range which exceeds 100 meters. Accordingly, short-range radio communication links lack the deficiencies of both infrared and cellular technologies which have limited the distribution of electronic services such as applications and data over wireless communications links.

SUMMARY OF THE INVENTION

The present invention provides a system and method for providing electronic services such as applications and data to wireless devices in a personal area network (PAN). In particular, an ASP delivery method in accordance with the inventive arrangements can provide a short-range radio frequency communications system communicatively linked to a host computing device which is further communicatively linked to an external computer communications network. Using the method of the invention, requested ASP services can be provided by the host computing device to end-users over short-range radio communications links to wireless devices in a personal area network (PAN). Furthermore, where requested ASP services are not readily available in the host computing device, requested ASP services can be retrieved from other ASPs in the external computer communications network and forwarded to requesting wireless devices in the PAN.

In operation, a short-range radio communications link can be established with a wireless device in the PAN. Once the link has been established, requests for selected ASP services can be received from the wireless device. For each received request, it can be determined whether the host computing device can provide the requested ASP services without requiring further assistance from another ASP in the external computer communications network. In that regard, if it is determined that the host computing device cannot provide the requested ASP services without requiring further assistance from another ASP, the host computing device can retrieve the requested ASP services from another ASP in the computer communications network. Once retrieved, the requested ASP services can be forwarded to the wireless device in the PAN over the short-range radio communications link.

The step of establishing a short-range radio communications link with the wireless device in the PAN can include establishing a BLUETOOTH-based communications link with the wireless device. Alternatively, the step of establishing a short-range radio communications link with the wireless device in the PAN can include establishing an IEEE 802.11b based communications link with wireless device. Finally, the step of establishing a short-range radio communications link with the wireless device in the PAN can comprise establishing an IEEE 802.11a based communications link with the wireless device.

An ASP delivery system which has been configured in accordance with the inventive arrangements can include a host computing device configured to communicate both with a computer communications network and with a plurality of wireless devices in a personal area network (PAN). In particular, a short-range radio communications system can be provided with which wireless communications in the PAN can be established and maintained. A list of ASP services further can be provided which indicates those ASP services which can be accessed by the wireless devices in the PAN. The ASP services in the list can reside locally in the host computing device and remotely in ASP servers in the computer communications network.

As in the case of the method of the invention, the short-range radio communications system can include a short-range radio communications system configured in accordance with BLUETOOTH specifications. Alternatively, the short-range radio communications system can include a short-range radio communications system configured in accordance with IEEE 802.11b specifications. Finally, the short-range radio communications system can include a short-range radio communications system configured in accordance with IEEE 802.11a specifications.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a system and method for providing Application Service Provider (ASP) service offerings in a personal area network (PAN). More specifically, an ASP delivery system can include a short-range radio communications system for transmitting and receiving data wirelessly in a PAN. Notably, the ASP delivery system can be communicatively linked to a computer communications network. The ASP delivery system can establish short-range radio communications links with wireless devices which enter the PAN. Once a short-range radio communications link has been established with the wireless device, the ASP delivery system can receive requests for ASP services and data from the wireless devices in the PAN.

Upon receipt of those requests, the ASP delivery system can determine whether those requested ASP service and data are available locally in the ASP delivery system. If so, the ASP delivery system can provide the requested ASP services and data to the requesting wireless device. By comparison, if it is determined that the requested ASP services and data do not reside locally in the ASP delivery system, the ASP delivery system can retrieve over the computer communications network the requested ASP services and data. Subsequently, the ASP delivery system can forward the ASP services and data to the requesting wireless device in the PAN over the short-range radio communications link.

Figure 1:
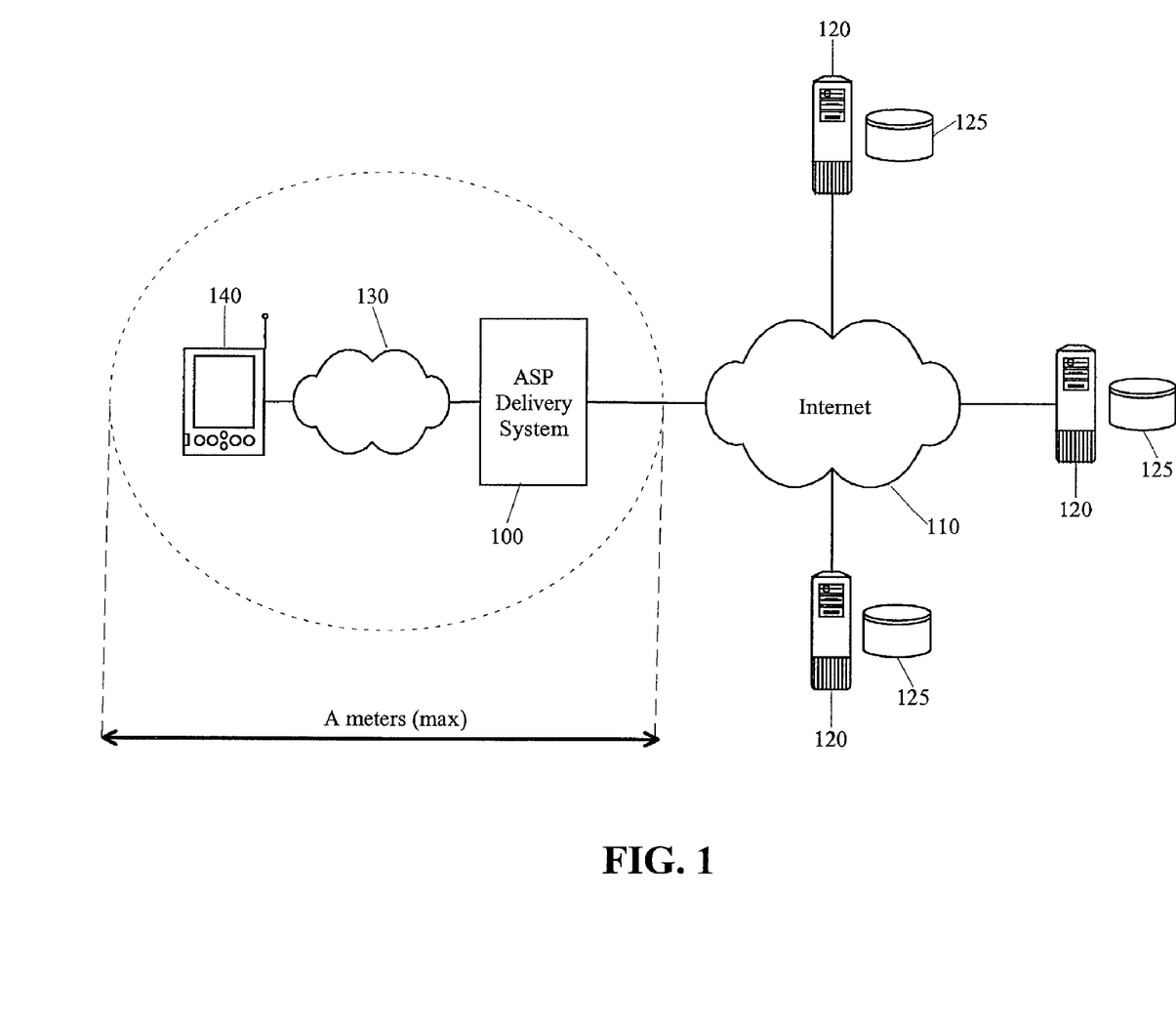
FIG. 1 is a schematic diagram illustrating an exemplary system for providing ASP service offerings in a PAN.

FIG. 1 is a schematic diagram illustrating an exemplary system for providing ASP service offerings in a PAN. As shown in FIG. 1, the system can include both a PAN 130 and a computer communications network 110, for example the Internet. The computer communications network 110 can include a plurality of ASP servers 120 which can distribute ASP services such as data and applications to requesting clients. The ASP services and data can be stored in network storage 125. Notably, while FIG. 1 depicts network storage 125 as an entity positioned closely to the ASP servers 120, the invention is not limited in this regard and the network storage 125 can be positioned elsewhere in the communications network from where the network storage 125 can be remotely accessed by the ASP servers 120. Importantly, the ASP servers 120 can serve applications or data.

In accordance with the inventive arrangements, an ASP delivery system 100 can be communicatively linked to the computer communications network 110. In particular, the ASP delivery system 100 can be linked through wireline means, for example a T-1 or DSL communications link, or wirelessly through cellular or other radio frequency (RF) means. In accordance with the inventive arrangements, the ASP delivery system 100 can be any self-contained structure, and can include access to communications networks such as a public switched telephone network (PSTN) via communications links through which the communications network 110 can be accessed.

The ASP delivery system 100 can be configured with short a range radio frequency system with which the ASP delivery system 100 can participate in the PAN 130. By participate, it is meant that the ASP delivery system 100 can detect PAN-enabled devices 140 geographically proximate to the ASP delivery system 100 with which the ASP delivery system 100 can establish a communications connection over which the ASP delivery system 100 can transmit and receive data. Typically, in some short-range radio frequency communications systems, the geographic proximity between two communicating devices in the PAN 130 does not exceed a fixed distance, for instance 100 meters, although the invention is not limited to the precise communications characteristics of the short-range radio frequency communications system used to establish the PAN 130. Rather, the present invention contemplates the characteristics of any suitable short-range radio frequency communications system with which the PAN 130 can be established.

A short range radio communications system in one aspect of the present invention can be implemented using standard Bluetooth™ wireless technology as described in Riku Mettala, *Bluetooth Protocol Architecture Version* 1.0, Nokia Mobile Phones, (1999) and 1 *Specification of the Bluetooth System Wireless Connections Made Easy*, Bluetooth SIG (1999), both incorporated herein by reference. Bluetooth is a low-cost, low-power, short-range radio link for mobile devices and for WAN/LAN access points. Bluetooth offers fast and reliable digital transmissions of both voice and data over the globally available 2.4 GHz ISM (Industrial, Scientific and Medical) band. The Bluetooth specification defines a short (around 10 m) or optionally a medium range (around 100 m) radio link capable of voice or data transmission up to a maximum capacity of 720 Kb/s per channel. Radio frequency (RF) operation is in the un-licensed industrial, scientific and medical (ISM) band at 2.4 to 2.48 GHz, using a spread spectrum, frequency hopping, full-duplex signal at up to 1600 hops/sec. The signal hops among seventy-nine (79) frequencies at 1 MHz intervals to give a high degree of interference immunity. RF output is specified as 0 dBm (1 mW) in the 10 m-range version and −30 to +20 dBm (100 mW) in the longer range version.

Bluetooth enabled devices which come within range of each other can establish an ad hoc point-to-point and/or pointto-multipoint connections. Bluetooth enabled devices dynamically can be added to or removed from a PAN. Notably, two or more Bluetooth enabled units which share a channel form a piconet. Several piconets can be established and linked together in ad hoc "scatternets" to allow communication and data exchange in flexible configurations. If several other piconets are within range, each can operate independently while maintaining access to the full bandwidth of the scatternet. Each piconet is established by a different frequency hopping channel. All users participating on the same piconet are synchronized to this channel. Notably, unlike infrared devices, Bluetooth enabled devices are not limited to line-of-sight communication.

Figure 2:
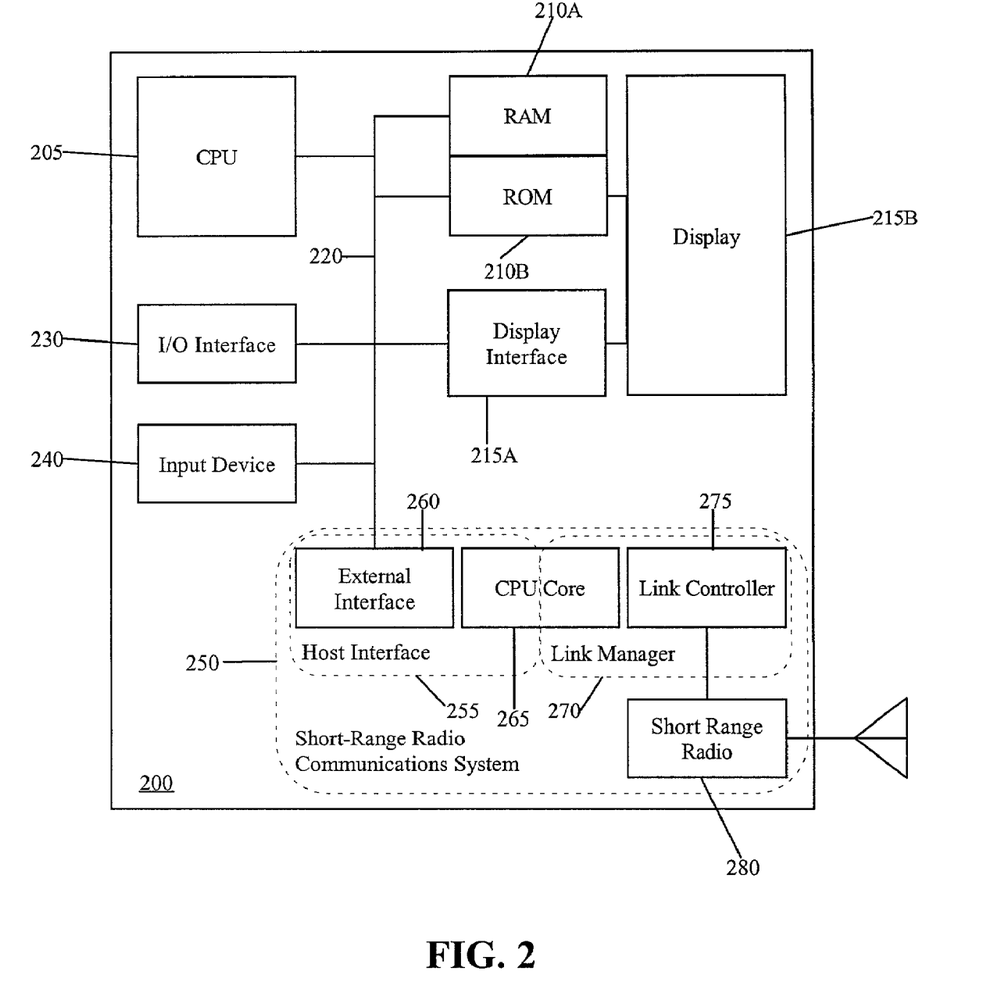
FIG. 2 is a schematic diagram illustrating a device enabled for short-range radio communications in the PAN of FIG. 1.

As an example, FIG. 2 is a schematic diagram illustrating a host computing device 200 configured for Bluetooth communications in the PAN 130 of FIG. 1. The host computing device 200 can include a central processing unit (CPU) 205, memory 210A, 210B, a display interface 215A and corresponding display 215B, an input/output (I/O) interface 230 and input device 240. As shown in the figure, in one aspect of the present invention memory 210A can be volatile, random access memory (RAM). Similarly, memory 210B can be non-volatile, read-only memory. The display interface 215A can be any controller suitable for presenting data visually through the display 215B. The display 215B can be any conventional display such as an LCD, monitor, etc. The I/O interface 230 can be any suitable interface for receiving or transmitting data to and from the host computing device 200. Examples of I/O interfaces can include a serial interface, universal serial bus (USB) port, infrared port, fire-wire port, etc. Finally, the input device 240 can be any suitable device for providing user input for the host computing device 200. Examples of input devices can include a keyboard, microphone, pointing device, touch-screen, etc.

Each of the CPU 205, memory 210A, 210B, display interface 215A and corresponding display 215B, I/O interface 230 and input device 240 can be arranged conventionally as is the case with conventional computers. In particular, each of the CPU 205, memory 210A, 210B, display interface 215A and corresponding display 215B, I/O interface 230 and input device 240 can be communicatively linked through bus 220. Notwithstanding, the invention is not limited either in regard to the particular conventional computing components which comprise the host computing device 200, or the particular arrangement of the conventional computing components. Rather, as will be apparent to one skilled in the art, the host computing device 200 configuration is limited only inasmuch as the host computing device 200 must include a short range radio communications system 250, for example a Bluetooth, IEEE 802.11b or IEEE 802.11a communications system.

As shown in FIG. 2, a short range radio communications system 250 based upon the Bluetooth specification can include an analog short range radio 280 and a digital host controller 255, 270. The host controller 255, 270 can include a host interface (HI) 255 and a link manager (LM) 270. The LM 270 can include a digital signal processor referred to as a link controller (LC) 275 and a CPU core 265. The HI 255 can also include the CPU core 265 and an external interface 260 to the bus 220 of the host computing device 200. The LC 275 consists of circuitry and firmware which can perform baseband processing and physical layer protocols such as ARQ protocol and FEC coding. The function of the LC 275 includes asynchronous data transfers, synchronous data transfers, and optionally, audio coding and encryption. The CPU core 265 can be programmed to handle inquiries and filter page requests without involving the host device 200. Specifically, the host controller 255, 270 can be programmed to answer certain page messages and authenticate remote links. The LM 270 executes on the CPU core 265. The LM discovers other LMs and communicates with them via a link manager protocol (LMP) to perform its service provider role and to use the services of the underlying LC.

Figure 3:
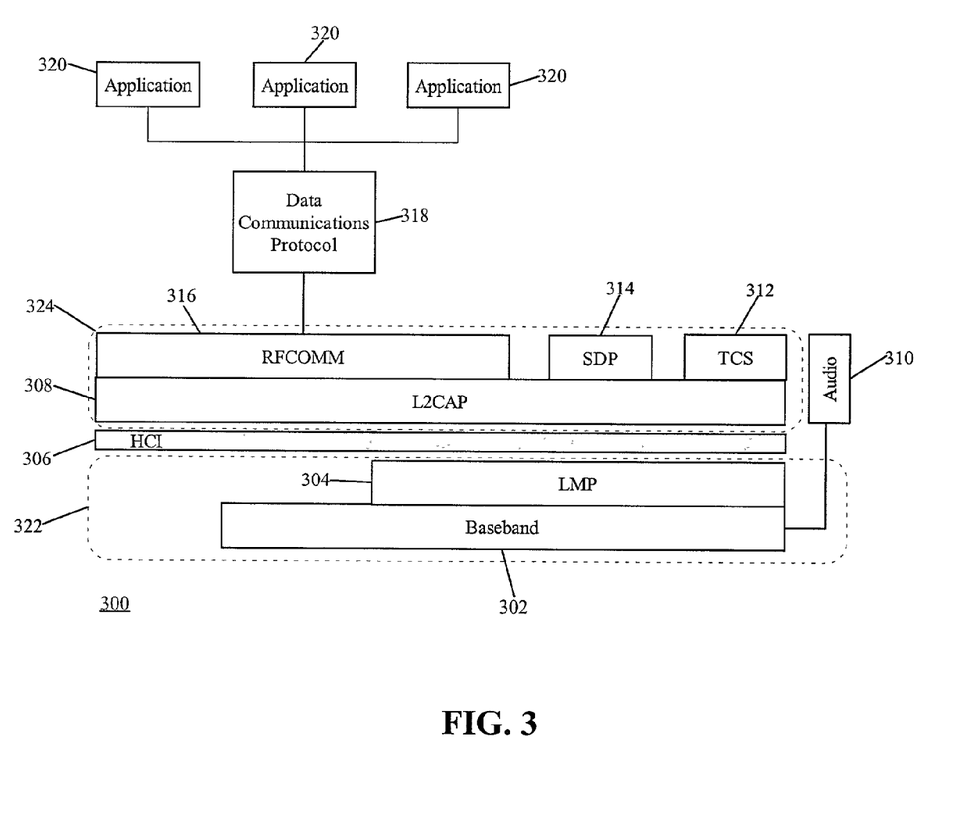
FIG. 3 is an architecture suitable for use in the device of FIG. 2.

FIG. 3 illustrates a Bluetooth-based short range radio communications architecture 300 suitable for use in the host computing device 200 of FIG. 2. The architecture 300 can include radio communications device based low level baseband services 322 and host device-based high level protocols 324 through which external host computing applications 320 can communicate using standard communications protocols 318 such as TCP/IP or UDP/IP with other devices in the PAN. Notably, in order to facilitate compatibility between different hardware implementations associated with the low level baseband services 322, a host controller interface (HCI) 306 can be used as a common interface between the host computing device and the radio communications system core. Higher level protocols like the service discovery protocol (SDP) 314, RFCOMM 316 (emulating a serial port connection) and the Telephony Control protocol (TCS) 312 are interfaced to the low level baseband services 322 via a logical link control and adaptation protocol (L2CAP) 308. Notably, the SDP 314 allows applications to find out about available services and their characteristics when devices are moved or switched off. Among the tasks associated with L2CAP 308, L2CAP 308 can perform the segmentation and re-assembly of data to allow larger data packets to be carried over a short range radio communications baseband connection.

The host computing device 200 as configured in FIG. 2 with the short range radio communications system 250 and having the architecture of FIG. 3 can be utilized both as a short-range radio frequency communications platform for a PAN-enabled ASP delivery system such as ASP delivery system 100 of FIG. 1, and as a short-range radio frequency communications platform for a PAN-enabled device such as the PAN-enabled device 140 of FIG. 1. Exemplary PAN-enabled devices which can be configured to operate with a short range radio communications system 250 as shown in FIG. 2 can include personal digital assistants (PDAs), cellular phones, handheld computers, laptop/notebook computers, wristwatches, etc.

Referring back to FIG. 1, in operation an ASP delivery system 100 can be configured with a short range radio communications system so as to participate in the PAN 130 as an ASP service provider. When a PAN-enabled device 140, such as a Bluetooth-enabled PDA enters the piconet formed by the PAN 130, the PAN-enabled device can retrieve a list of available ASP services from the ASP delivery system 100. ASP services can include, but are not limited to distributed applications and data, for example electronic mail, sports scores, and stock prices. One or more particular ASP services can be selected in the PAN-enabled device 140 responsive to which the ASP delivery system 100 can distribute the selected ASP services to the device 140. If, however, the ASP delivery system 100 does not have locally stored therein a selected ASP service, the ASP delivery system 100 can request the missing service from an server 120 in the existing communications network 110. Upon receipt of the missing service from the appropriate server 120, the ASP delivery system 100 can forward the service to the PAN-enabled device 140 in the PAN 130.

Figure 4:
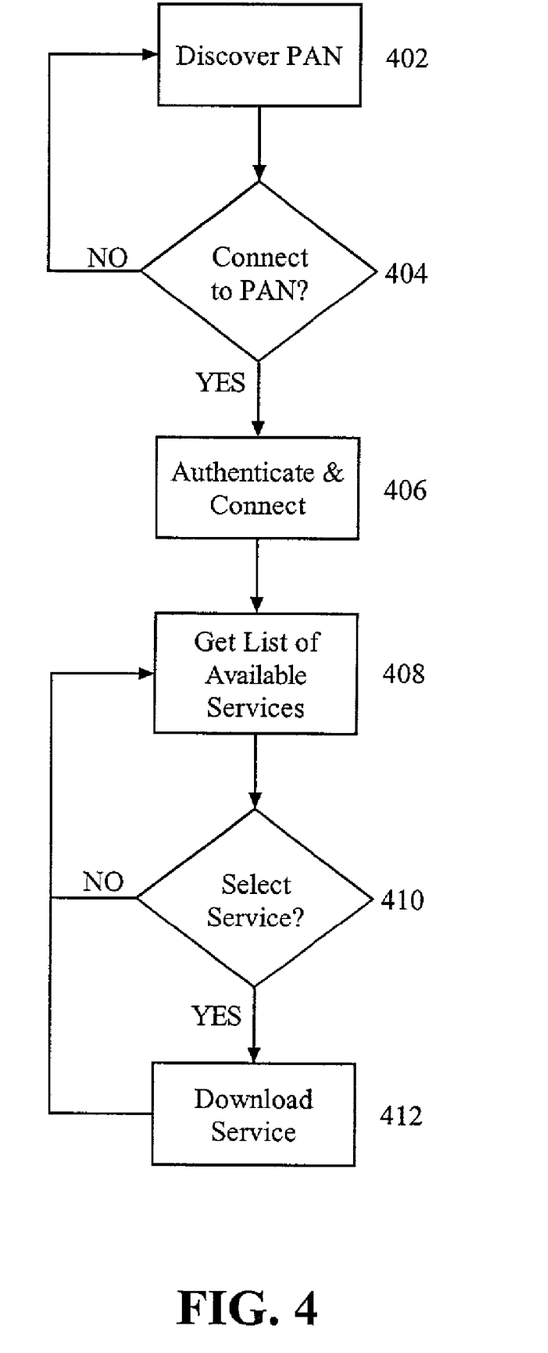
FIG. 4 is a flow chart illustrating a process for receiving distributed ASP services in a PAN.

FIG. 4 is a flow chart illustrating a process performed in a PAN-enabled device for receiving distributed electronic services in a PAN via an ASP delivery system according to the invention. Beginning in step 402, a PAN-enabled device entering a PAN can electronically detect the presence of the PAN using, for example conventional service discovery protocols. Service discovery protocols are well-known in the art and provide devices in ad hoc peer-to-peer networks to dynamically discover devices and services. As such, service discovery architectures enable self-configuring dynamic networks by providing a standard method for applications, services and devices to describe and to advertise their capabilities to other applications, services and devices and to discover their capabilities. Service discovery architectures also enable applications, services and devices to search other applications, services or devices for a particular capability, and to request and establish interoperable sessions with them to utilize those capabilities.

Returning now to FIG. 4, in step 404, the device can determine whether to connect to or ignore the PAN. Specifically, the connection determination can be performed by a user, or by the device automatically based on pre-configured selections such as "connect to all PANs" or "connect to the following PANs only". If, in step 404 the device chooses to connect to the PAN, in step 406 the device can undertake and authentication process prior to connection during which process the device can be recognized as a legitimate PAN client and associated with a unique identifier through which other devices in the PAN can recognize and communicate with the PAN-enabled device.

Once connected, in step 408, the PAN-enabled device can identify the PAN-enabled existing ASP delivery system and can query the ASP delivery system for available ASP services. Alternatively, upon detecting the presence of the PAN-enabled device, the ASP delivery system can automatically transmit a list of available ASP services to the PAN-enabled device. If in step 410 one or more ASP services are selected, either automatically by the PAN-enabled device, or manually by the user, in step 412 the selected services can be downloaded to the PAN-enabled device from the ASP delivery system. Notably, even if no services are selected in step 410, so long as the PAN-enabled device remains in the piconet formed by the PAN, the list of available services can be accessed.

Figure 5:
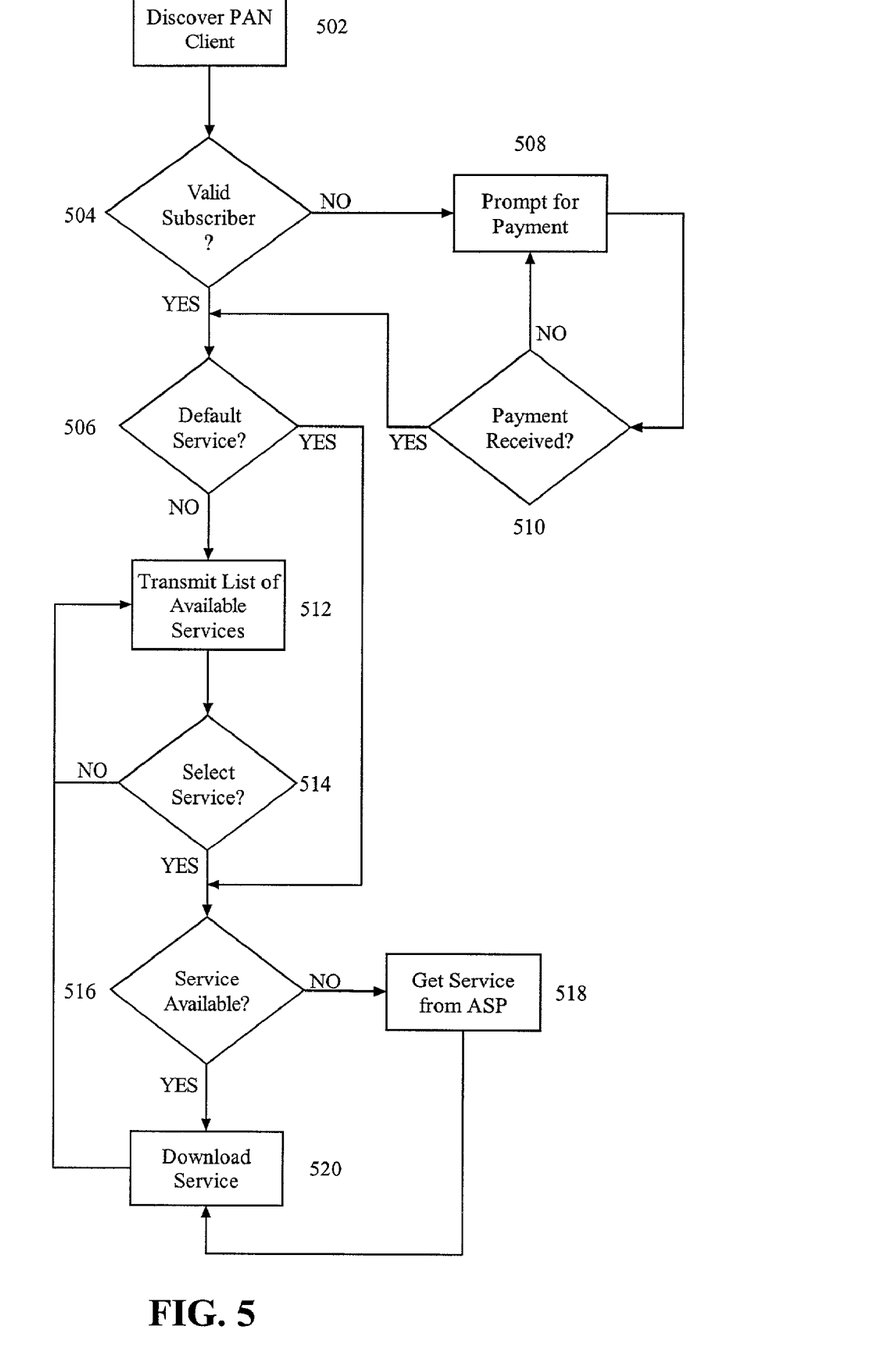
FIG. 5 is a flow chart illustrating a process for distributing ASP services from an application service provider in a communications network to a wireless device in a PAN.

By comparison, upon detecting a PAN-enabled device, an ASP delivery system in accordance with the inventive arrangements can undertake the process illustrated in FIG. 5. FIG. 5 is a flow chart illustrating a process for distributing ASP services from an application service provider in a communications network to a wireless device in a PAN via the ASP delivery system. Beginning in step 502, the ASP delivery system can detect the presence of a PAN-enabled device using, for example conventional service discovery protocols. In step 504, it can be determined if the detected device is a valid subscriber to electronic services offered by the ASP delivery system. If the detected device is not a valid subscriber, the ASP delivery system can prompt the user of the device for pay-per-use payment in step 508. Alternatively, the ASP delivery system can prompt the user of the device to register for a subscription. Moreover, the ASP delivery system can provide to the device a limited trial period subscription. In any case, the invention is not limited in regard to the precise business model for providing access to services provided by the ASP delivery system.

If in step 510 payment is received, or if in step 504 the device is determined to be a subscriber device, in step 506 it can be determined whether the detected device has associated therewith a pre-configured default electronic service. If not, in step 512 the ASP delivery system can provide to the device a list of available services. The list can be computed based on any number of factors, for example all available services, or a limited selection based on prioritization, perceived value, or advertising revenue, historical transaction statistics, device and network resources, or a pre-configuration. In step 514, if one or more services has been selected, or if a default service is selected, in step 516 the ASP delivery system can determine whether the complete ASP service is available locally in the ASP delivery system, or whether one or more components of the ASP service must be retrieved from an ASP in the existing communications network.

If the ASP delivery system is able to locally retrieve the entire selected ASP service, in step 520 the ASP delivery system can transmit to the detected device the requested ASP service. Otherwise, if one or more components of the selected ASP service are not available locally in the ASP delivery system, the ASP delivery system can determine as suitable ASP from which the selected ASP service can be retrieved. Subsequently, in step 518, the ASP delivery system can retrieve therefrom the requested ASP service. Importantly, in the case where some of the components of the electronic service are present in the ASP delivery system while other components of the requested ASP services must be retrieved from an ASP, the ASP delivery system can begin transmission of the present components during the retrieval of the remaining components from the ASP. Likewise, as components are retrieved from the ASP, the retrieved components can be forwarded to the device while the remaining components are retrieved. In this way, apparent and actual response times can be reduced.

Use of an ASP delivery system configured in accordance with the inventive arrangements can permit casual use of applications by wireless devices and can involve either downloading complete applications, for example a crossword puzzle game for carry away use, or can involve more traditional ASP hosting of complex applications. Significantly, an ASP delivery system configured in accordance with the inventive arrangements can be used for targeted service distribution, for example based on geography. More particularly, depending on the nature and location of the ASP delivery system, particular electronic services can be stored locally in the ASP delivery system and the ASP delivery system can be configured to retrieve particular services from communicatively linked servers. For example, in the case of an airport or train station ticket counter, travel related electronic services such as airplane timetables, weather news, crossword puzzle programs and electronic mail can be automatically or manually distributed to travelers entering an associated PAN with a PAN enabled device.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. A method for delivering an Application Service Provider (ASP) service to a wireless device in a personal area network (PAN), the method comprising:

providing an ASP delivery system connected to a computer communications network over a physical communications link and connected to the PAN via a short-range radio frequency communications link, said ASP delivery system being configured to deliver components of ASP services over the short-range radio communications link to the wireless device in the PAN, said ASP delivery system also being configured to store some components of ASP services locally and to retrieve at least a portion of said components of said ASP services from ASPs in said computer communications network over said physical communications link when necessary, wherein said components of said ASP services comprise a plurality of different software programs from among which a user of the wireless device selects and interacts with via the short-range radio communications link;

detecting a presence of the wireless device in the PAN by the ASP delivery system using service discovery protocols;

establishing a short-range radio communications link with the wireless device in said PAN and verifying subscription of or offering subscription to the wireless device;

determining whether the wireless device has associated with a default service if the wireless device is a valid subscriber device;

prompting the user of the wireless device for pay-per-use payment if the wireless device is not a valid subscriber device;

transmitting to said wireless device over the established short-range radio communications link a list of ASP services available in the ASP delivery system or retrievable from ASPs in the computer communications network;

receiving from said wireless device requests for at least one of said ASP services selected from said list of ASP services;

for each component of said selected ASP services, determining if said ASP delivery system can immediately deliver said component without requiring retrieval of said component from ASPs and immediately delivering said component to said wireless device if retrieval of said component is not required; and, if said ASP delivery system cannot deliver said component without requiring retrieval of said component from ASPs, retrieving said component for said at least one ASP service from one of said ASPs over said physical communications link.

2. The method of claim 1, wherein said step of establishing a short-range radio communications link with said wireless device in said PAN comprises:
establishing a BLUETOOTH-based communications link with said wireless device.

3. The method of claim 1, wherein said step of establishing a short-range radio communications link with said wireless device in said PAN comprises:
establishing an IEEE 802.11b based communications link with said wireless device.

4. The method of claim 1, wherein said step of establishing a short-range radio communications link with said wireless device in said PAN comprises:
establishing an IEEE 802.11a based communications link with said wireless device.

5. A system for delivering an Application Service Provider (ASP) service to a wireless device in a personal area network (PAN), the system comprising:
an ASP delivery system connected to a computer communications network over a physical communications link and connected to the PAN via a short-range radio frequency communications link, said ASP delivery system being configured to deliver components of ASP services over the short-range radio communications link to the wireless device in the PAN, said ASP delivery system also being configured to store some components of ASP services locally and to retrieve at least a portion of said components of said ASP services from ASPs in said computer communications network over said physical communications link when necessary, wherein said components of said ASP services comprise a plurality of different software programs from among which a user of the wireless device selects and interacts with via the short-range radio communications link;

means for detecting a presence of the wireless device in the PAN by the ASP delivery system using service discovery protocols;

means for establishing a short-range radio communications link with the wireless device in said PAN and verifying subscription of or offering subscription to the wireless device;

means for determining whether the wireless device has associated with a default service if the wireless device is a valid subscriber device;

means for prompting the user of the wireless device for pay-per-use payment if the wireless device is not a valid subscriber device;

means for transmitting to said wireless device over the established short-range radio communications link a list of ASP services available in the ASP delivery system or retrievable from ASPs in the computer communications network;

means for receiving from said wireless device requests for at least one of said ASP services selected from said list of ASP services; and means for determining, for each component of said selected ASP services, if said ASP delivery system can immediately deliver said component without requiring retrieval of said component from ASPs and immediately delivering said component to said wireless device if retrieval of said component is not required, if said ASP delivery system cannot deliver said component without requiring retrieval of said component from ASPs, retrieving said component for said at least one ASP service from one of said ASPs over said physical communications link.

6. The system of claim 5, wherein said short-range radio communications
link is configured in accordance with BLUETOOTH specifications.

7. The system of claim 5, wherein said short-range radio communications
link is configured in accordance with IEEE 802.11a.

8. The system of claim 5, wherein said short-range radio communications
link is configured in accordance with IEEE 802.11b.

9. The method of claim 1, wherein each of the different software programs is configured to be executed by said wireless device.

10. An Application Service Provider (ASP) service delivery method, comprising:
providing a short-range radio frequency communications system, said system having an ASP delivery system connected to a computer communications network over a physical communications link, said ASP delivery system being configured to deliver components of ASP services over a short-range radio communications link to a wireless device in a personal area network (PAN), said ASP delivery system also being configured to store some components of ASP services locally and to retrieve over said physical communications link at least a portion of said components for available ASP services from ASPs in said computer communications network, wherein said components of said available ASP services comprise a plurality of different software programs from among which a user of the wireless device can select at least one; detecting a presence of the wireless device in the PAN by the ASP delivery system using service discovery protocols establishing the short-range radio communications link with the wireless device in said PAN;

determining whether the wireless device has associated with a default service if the wireless device is a valid subscriber device;

prompting the user of the wireless device for pay-per-use payment if the wireless device is not a valid subscriber device;

transmitting a list of said available ASP services from said ASP delivery system to said wireless device the short-range radio communications link;

said wireless device requesting to said ASP delivery system at least one available ASP service listed among the list of said available ASP services;

for each component of said at least one requested ASP service, determining if said ASP delivery system can provide said component for said requested at least one ASP service without requiring retrieval of said component from said ASPs and immediately forwarding to said wireless device said component if retrieval of said component from said ASPs is not required; and, if said ASP delivery system cannot forward said requested at least one ASP service without requiring retrieval of said component from said ASPs, retrieving said component from said ASPs over said physical communications link and forwarding said retrieved component to said wireless device in said PAN over said short-range radio communications link.

11. The method of claim 10, wherein said list of available ASP services is transmitted to said wireless device in response to a query transmitted by said wireless device.

12. The method of claim 10, wherein said list of available ASP services is transmitted to said wireless device automatically from said available ASPs in response to detecting a presence of said wireless device within said PAN.

13. The method of claim 10, further comprising determining whether said wireless device is a valid subscriber of said available ASPs services.

14. The method of claim 13, further comprising prompting said wireless device to register with the available ASPs if said wireless device is not a valid subscriber.

15. The method of claim 10, wherein the list of available services is determined based upon at least one of prioritization, transaction statistics, resources of said wireless device, and resources of said communications system.

16. The method of claim 10, wherein each of the different software programs is configured to be executed by said wireless device.

* * * * *

UNITED STATES PATENT AND TRADEMARK OFFICE
CERTIFICATE OF CORRECTION

PATENT NO.       : 7,647,021 B2
APPLICATION NO. : 09/923506
DATED            : January 12, 2010
INVENTOR(S)      : Moore et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 869 days.

Signed and Sealed this

Sixteenth Day of November, 2010

David J. Kappos
*Director of the United States Patent and Trademark Office*